United States Patent [19]

Lutz et al.

[11] 3,885,955

[45] May 27, 1975

[54] PROCESS FOR THE PRODUCTION OF GOLD POWDER

[75] Inventors: Klaus Lutz, Bergen-Enkheim; Manfred Golla, Grossauheim, both of Germany

[73] Assignee: Demetron Gesellschaft fur Elektronik-/Werkstoffe mbH, Germany

[22] Filed: June 10, 1974

[21] Appl. No.: 478,037

[30] Foreign Application Priority Data
June 8, 1973 Germany.............................. 2329352

[52] U.S. Cl.................................. 75/.5 A; 75/118 R
[51] Int. Cl....................... C22b 11/04; C22b 11/06
[58] Field of Search............................ 75/.5 A, 118

[56] References Cited
UNITED STATES PATENTS

| | | | |
|---|---|---|---|
| 3,201,223 | 8/1965 | Cuhra et al. | 75/118 |
| 3,620,173 | 11/1971 | Short | 75/.5 A |
| 3,843,379 | 10/1974 | Daiga | 75/.5 A |

*Primary Examiner*—W. Stallard
*Attorney, Agent, or Firm*—Cushman, Darby & Cushman

[57] ABSTRACT

Gold powder of different predeterminable particle size, particle shapes and specific surface area predeterminable by the choice of reaction conditions is obtained by precipitation of chloroauric (III) acid with ammonia from an aqueous hydrochloric acid solution and reducing the precipitate as a suspension with a reducing agent.

14 Claims, No Drawings

PROCESS FOR THE PRODUCTION OF GOLD POWDER

The present invention is directed to a process for the production of gold powder with different particle sizes, particle shapes and specific surface areas predeterminable by the choice of reaction conditions by reduction of suspended so-called "fulminating gold". Gold powder of various particle sizes, particle shapes and different specific surface areas are required in many areas of the arts, as for example, for the production of decorative articles, electrical conductors and resistances, or printed circuits.

There are known a whole series of processes for the precipitation of gold salt solution, especially of chloroauric (III) acid ($HAuCl_4$), from aqueous solutions by means of a reducing agent in a chemical way with varying reaction conditions. As reducing agents there are used for example, active non-noble metal powders such as zinc, magnesium, lead, bismuth, cadmium, aluminum or iron, inorganic materials such as hydrogen peroxide, iron (II) sulfate, sodium sulfite, potassium sulfite, or sulfur dioxide, hydrazine, sulfur dioxide, hydroxylamine or organic reagents such as alkanolamines, e.g., triethanolamine, formic acid, formaldehyde, oxalic acid, alkali oxalates, e.g., sodium oxalate and potassium oxalate, hydroquinone, lower alkyl hydroquinones, e.g., methyl hydroquinone, dimethyl hydroquinone, ethyl hydroquinone, and butyl hydroquinone, chlorohydroquinone, bromohydroquinone. Thus, attention is called to German Auslegeschrift 2,154,093, German Offenlegungsschrift 2,154,108 and German Offenlegungsschrift 1,515,890, all three of which are hereby incorporated in their entirety by reference.

The properties of a gold powder and therewith its utility in the arts depend extensively on the process with which it is produced. Frequently, the powders formed are very non-uniform in regard to particle size and particle shape which is perceptibly very disturbing and disadvantageous in many fields of use.

Therefore, it was the problem of the present invention to find a process for the production of gold powder which permits the production of powders with predominantly uniform particle size and particle shape and definite specific surface area or by the corresponding choice of reaction conditions produce powders of different particle size and shape with various specific surface areas.

It has now been found according to the invention that there can be produced gold powders with predeterminable different particle sizes and shapes as well as different specific surface areas by the choice of reaction conditions, if the precipitate formed in the precipitation of chloroauric (III) acid from an aqueous hydrochloric acid solution is reduced as a suspension with a reducing agent.

In the precipitation of acidic gold chloride solutions with ammonia there is formed a precipitate known as fulminating gold. This fulminating gold explodes in the dry condition upon heating. However, it is harmless to handle in the wet condition.

As the starting solution for the production of fulminating gold there is used a hydrochloric acid solution of gold chloride which contains the gold essentially as chloroauric (III) acid. Since the composition of the precipitate formed in the addition of ammonia is dependent on the hydrochloric concentration of the starting solution, it has proven advantageous to use acidic gold chloride solutions containing 2–15 percent of free hydrochloric acid. Especially approved are gold chloride solutions with 5–10 percent free hydrochloric acid. The concentration of chloroauric (III) acid can vary between 1 and 35 percent of the solution.

The fulminating gold formed by the precipitation with ammonia need not be isolated but after the decanting off of the solvent and several washings by decantation with water can be directly worked up further.

The washed fulminating gold is suspended in a suspension medium and reduced to gold by passing into the suspension or adding dropwise a chemical reducing agent. According to the choice of the suspension medium, the reducing agent and the reaction temperature there is obtained gold powder of different particle size and particle form as well as different specific surface area.

As suspension media, water, glycol ethers and water-glycol ether mixtures have proven satisfactory with ethylene glycol monoethyl ether being the preferred glycol ether. Other suitable glycol ethers are for instance ethylene glycol monomethyl ether, ethylene glycol monopropyl ether, ethylene glycol monobutyl ether, diethylene glycol monobutyl ether, ethylene glycol dibutyl ether, diethylene glycol monoethyl ether or ethylene glycol diethyl ether. The ratio of water to glycol can be varied widely but usually when such a mixture is used 30 to 70 percent of the total of water and glycol ether by weight is water and the balance glycol ether.

While there can be used any of the reducing agents mentioned above or other reducing agents known to reduce acidic gold chloride solutions to gold it is preferred to use sulfur dioxide, hydroxylamine, hydrazine or triethanolamine whereby there can be obtained powders of different particle sizes and forms as well as of various specific surface areas by using specific combinations of suspension agent and reducing agent in conjunction with the reaction temperature and, in a given case, the pH value.

Using water as the suspension agent and sulfur dioxide as reducing agent there are obtained at room temperature small gold spheres having a diameter of 3–10 $\mu$m. If there is used as the suspension medium a water-ethylene glycol monoethyl ether mixture and hydroxylamine as the reducing agent there is obtained at an operating temperature of 50° to 90°C. crystallites having a size of 1 to 10 $\mu$m.

In the same suspension agent (water and ethylene glycol monoethyl ether) but using triethanolamine as the reducing agent and a temperature of about 100°C. there is obtained a fine gold powder with particle sizes of 1 $\mu$m and less.

If the suspension medium of water-ethylene glycol monoethyl ether is brought to a pH value of 1 to 4 with hydrochloric acid and reduced with triethanolamine at 100°C. there are obtained fine needles having a length of 3–15 $\mu$m and a diameter of 1–2 $\mu$m.

Using hydrazine as the reducing agent there is obtained a powder having a higher specific surface area, brought about through pores in the crystallites. With water as the suspension agent and at an operating temperature of 50° to 70°C. there are obtained crystallites having a size of 20 $\mu$m or less and a specific surface area between 3 and 5 $m^2$/g. In the other processes of production according to the invention the specific surface area is always below 1.5 m²/g.

The starting chloroauric (III) acid solution usually contains 2-15 percent of free acid, preferably 5-10 percent. The gold concentration in the starting chloroauric (III) acid solution is not critical but is usually 1 to 35 percent gold by weight.

If there is added a solution of one or more metal salts, as for example silver nitrate, before the reduction of the suspension, there are obtained the corresponding mixed powders. In place of, or in addition to, the silver nitrate solution there can be added $PdCl_2$, $Pd(NO_3)_2$, $H_2(PtCl_6)$, $RhCl_3$.

The amount of reducing agent added is not of essential significance for the process of the invention. While it can be added in an amount to reduce all the gold, preferably the amount of reducing agent is greater than stoichiometrically required reaction with gold so that the reduction is quantitative. Large excesses of reducing agent are simply uneconomical.

Unless otherwise indicated all parts and percentages are by weight.

The following examples further explain the process of the invention.

EXAMPLE 1

3 kg of a chloroauric (III) acid solution containing 33% Au and a pH value of 0.5 were diluted with 3 liters of water and a solution of 1 liter of concentrated ammonia in 2 liters of water was added dropwise with stirring in the course of about 30 minutes. The temperature thereupon rose to 50°C., the pH value to 8 to 9. It was allowed to react further for 60 minutes and after settling of the precipitate the supernatant solution filtered off with suction. With powerful stirring up it was decanted several times with water and ethylene glycol monoethyl ether. The fulminating gold thus formed was worked up further directly.

EXAMPLE 2

100 grams of fulminating gold in the form produced in Example 1 was suspended in 500 ml of water. There was led in with stirring a weak stream of sulfur dioxide while the temperature was not permitted to go above 40°C. After the end of the reaction the product was washed several times with water and ethanol, filtered with suction and the gold powder dried at 70°C. 99.7 percent of the amount of gold added was obtained in the form of gold balls having a size of 3-10 m$\mu$ and having a specific surface of about 1.0 m²/g.

EXAMPLE 3

100 grams of gold in the form of fulminating gold produced according to Example 1 was suspended in a waterethylene glycol monoethyl ether mixture (1:1 by volume) and heated under reflux to 100°C. There were added slowly dropwise to the solution with powerful stirring a solution of 70 grams of hydroxylamine hydrochlorine in 150 ml of water whereupon there was noted a strong development of gas. After addition of the reducing agent it was allowed to react further for one hour. The gold powder formed was separated off as in Example 2, washed and dried. There were obtained about 99.7 percent of the gold added as crystallites having a granule size of 1-10 m$\mu$ with a specific surface area of 0.6 m²/g.

EXAMPLE 4

100 grams of gold in the form of fulminating gold prepared according to Example 1 were heated under reflux at 100°C. in 300 ml of a water and ethylene glycol monoethyl ether mixture (1:1 by volume). There were dropped in under strong stirring a solution of 60 grams of triethanolamine in 50 ml of water-ethylene glycol (1:1 by volume), whereupon a strong development of gas resulted. After the ending of the addition of the reducing agent, further reaction was allowed for one hour under reflux. The powder formed was separated off as in Example 2 and dried. There were obtained about 95 percent of the added gold as powder with a particle size of 1 m$\mu$ or less with a specific surface area of 1.4 m²/g.

EXAMPLE 5

100 grams of gold in the form of fulminating gold were suspended in 400 ml of a water-ethylene glycol monoethyl ether mixture (1:1 by volume) and acidified to pH 2 with hydrochloric acid. There were dropped in at 100°C. 60 grams of triethanolamine in 50 ml of water-ethanol (1:1 by volume). There was obtained in 99.5% yield small gold fibers having a length of 3-15 m$\mu$, a thickness of 1-2 m$\mu$, and a specific surface area of about 0.6 m²/g.

EXAMPLE 6

1 kg of gold in the form of fulminating gold were suspended in 4 liters of water and treated dropwise at 55°-60°C. with 1 kg of 25% hydrazine hydrate solution. There were obtained about 99.5 percent of the added gold as crystallites having a particle size of 1-20 m$\mu$ with a specific surface area of 3.5 m²/g.

EXAMPLE 7

100 grams of gold as fulminating gold were suspended in 400 ml of water-ethylene glycol monoethyl ether (1:1 by volume) and treated with 7 grams of silver in the form of silver nitrate. To the boiling suspension there were dropped in a solution of 70 grams of hydroxylamine hydrochloride in 150 ml of water. There were formed thereby a gold mixture powder containing about 7% silver as a crystallite having a size of 1-6 m$\mu$ and a specific surface area of 1.0 m²/g.

The gold powders as produced above in Examples 1-7 are preferably used for metallizing compositions.

The term "room temperature" is used in its ordinary sense as being a temperature of about 18° to 20°C.

What is claimed is:

1. A process of preparing gold powder of predetermined particle size, particle shape and specific surface area comprising precipitating chloroauric III acid from an aqueous hydrochloric acid solution thereof with ammonia, preparing a suspension of the precipitate in a liquid without drying and reducing the gold in said suspension to free metal with a reducing agent.

2. A process according to claim 1, wherein the suspension liquid comprises water and/or a glycol ether.

3. A process according to claim 2, wherein the solvent is a mixture of water and ethylene glycol monoethyl ether.

4. A process according to claim 2, wherein the chloroauric III acid containing solution contains 2-15 percent free hydrochloric acid.

5. A process according to claim 4 wherein said solution contains 5–10 percent of hydrochloric acid.

6. A process according to claim 2, wherein the reducing agent is sulfur dioxide, hydroxylamine, hydrazine or triethanolamine.

7. A process according to claim 2, for the production of gold powder in the form of 5–10 $\mu$m spheres comprising employing water as the suspension liquid and sulfur dioxide as the reducing agent at room temperature.

8. A process according to claim 2, for the production of gold powder in the form of 1–10 $\mu$m crystallites comprising employing a water-ethylene glycol monoethyl ether mixture as the suspension liquid and hydroxylamine as the reducing agent at a temperature of 50° to 90°C.

9. A process according to claim 2 for the production of gold powder having a particle size of not over 1 $\mu$m comprising employing a water-ethylene glycol monoethyl ether mixture as the suspension liquid and triethanolamine as the reducing agent at a temperature of about 100°C.

10. A process according to claim 2, for the production of gold powder in the form of fine fibers comprising employing a water-ethylene glycol monoethyl ether mixture acidified to a pH of 1–4 as the suspension liquid and triethanolamine as the reducing agent at about 100°C.

11. A process according to claim 2 for the production of gold powder with a specific surface area between 3 and 5 $m^2/g$ comprising employing water as the suspension liquid and hydrazine as the reducing agent at 50°–70°C.

12. A process according to claim 2 wherein there is added a reducible salt of a metal other than gold to the gold suspension and there is formed in the reduction a mixture of gold and other metal.

13. A process according to claim 12, wherein said metal is silver.

14. A process according to claim 12 wherein the metal salt is silver nitrate.

* * * * *